(12) United States Patent
An et al.

(10) Patent No.: US 11,216,588 B1
(45) Date of Patent: Jan. 4, 2022

(54) PRIVATE CROSS-MEDIA MEASUREMENT USING HMAC AND BLOOM FILTERS

(71) Applicant: Facebook, Inc., Menlo Park, CA (US)

(72) Inventors: Ran An, Mountain View, CA (US); Payman Mohassel, San Jose, CA (US); Sanjay Kanaka Sai Tirupattur Saravanan, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 39 days.

(21) Appl. No.: 16/880,889

(22) Filed: May 21, 2020

Related U.S. Application Data (60) Provisional application No. 62/969,609, filed on Feb. 3, 2020.

(51) Int. Cl.
| | |
|---|---|
| *G06F 21/00* | (2013.01) |
| *G06F 21/62* | (2013.01) |
| *G06F 21/60* | (2013.01) |
| *H04L 9/08* | (2006.01) |
| *H04L 9/32* | (2006.01) |

(52) U.S. Cl.
CPC ........ *G06F 21/6245* (2013.01); *G06F 21/602* (2013.01); *G06F 21/6227* (2013.01); *H04L 9/0819* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 2014/0188870 A1* | 7/2014 | Borthakur | G06F 16/23 707/736 |
| 2016/0154861 A1* | 6/2016 | Hegerty | G06F 40/232 707/728 |
| 2017/0142213 A1* | 5/2017 | Golde | G06F 8/61 |

* cited by examiner

*Primary Examiner* — Andrew J Steinle
(74) *Attorney, Agent, or Firm* — Fenwick & West LLP (57) ABSTRACT

A cross-measurement system gathers data from a set of publishers to determine cross-publisher statistics about content provided on multiple online platforms associated with different publishers. The cross-measurement system receives a set of publisher-specific Bloom filters associated with content exposure of a content set by each of the multiple publishers. using the received publisher-specific Bloom filters, the cross-measurement system generates a cross-publisher Bloom filter, for example, by combining the publisher-specific Bloom filters. Then, the cross-measurement system analyzes the cross-publisher Bloom filter to determine cross-publisher statistics reflecting the content exposure of the content set across the set of publishers, such as a cross-publisher reach of the content set.

20 Claims, 6 Drawing Sheets

PRIVATE CROSS-MEDIA MEASUREMENT USING HMAC AND BLOOM FILTERS

CROSS REFERENCE TO RELATED APPLICATIONS

This application claims the benefit of U.S. Provisional Application No. 62/969,609, filed Feb. 3, 2020, which is incorporated by reference in its entirety.

BACKGROUND

This disclosure generally relates to monitoring provided content and, in particular, to calculating cross-publisher statistics for content presented across multiple platforms.

A content provider can provide the same or similar content for display by multiple independent publishers. Each publisher can display content items on platforms associated with that publisher to unique (but likely overlapping) sets of users of those platforms. Therefore, an individual user can be exposed to the same (or similar) content from the content provider by multiple publishers. Content providers may wish to measure various statistics about the provided content as a whole (across the set of publishers). Individual publishers can provide the content provider with generalized statistics about the content provided on their own platforms but may be unwilling or unable to combine data about their users with data about the users of other publishers (for example, for user privacy reasons).

SUMMARY

A cross-measurement system gathers data from a set of publishers to determine cross-publisher statistics about content provided on multiple online platforms associated with different publishers. The cross-measurement system receives a set of publisher-specific Bloom filters associated with content exposure of a content set by each of the multiple publishers. Using the received publisher-specific Bloom filters, the cross-measurement system generates a cross-publisher Bloom filter, for example, by combining the publisher-specific Bloom filters. Then, the cross-measurement system analyzes the cross-publisher Bloom filter to determine cross-publisher statistics reflecting the content exposure of the content set across the set of publishers, such as a cross-publisher reach of the content set.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A," "130B," and "130C" in the figures).

DETAILED DESCRIPTION

Overview

A content provider can provide a content set (comprising, for example, a set of similar content items relating to a topic) for display by multiple participating publishers. A content set is a group of content items generated by a content provider containing content items with a shared topic, purpose, or other similar elements. Each participating publisher can display content items on platforms associated with that publisher to unique (but likely overlapping) sets of users of those platforms. Therefore, an individual user can be exposed to the same (or similar) content items by multiple publishers depending on which platforms that user interacts with. Content providers may wish to measure various statistics about the content set across the set of publishers, for example, to determine whether to make changes to future content items to better engage with users. Individual publishers can provide the content provider with generalized statistics about the content provided on their own platforms based on exposure data gathered by the publisher. However, a single user can interact with content items of the content set across multiple publisher's platforms (and will therefore show up in individual statistics from multiple publishers and simply combining individual publisher reach statistics would not give an accurate representation of an actual reach of the content set. To determine statistics about the content set across the set of publishers, the content provider and set of publishers can collaborate with a cross-measurement system to determine cross-publisher statistics about the content set, including a "cross-publisher reach" of the content set according to some embodiments. As used herein, a "cross-publisher statistic" refers to a statistic about a content set calculated for all the publishers in aggregate, and the "cross-publisher reach" of a content set is the total number of unique users who have been displayed a content item of the content set across the set of participating publishers.

In some implementations, individual publishers maintain records of which individual users are exposed to the content (herein, "content exposure data"). However, content exposure data can contain PII (personally identifiable information) of the users exposed to the content item, for example, a log of names, IP addresses, and/or email addresses identifying each user exposed to the content item set. In some situations, publishers are unable or unwilling to share content exposure data containing PII with other publishers or the content provider, for example to protect user privacy. Therefore, techniques to estimate cross-publisher reach for a content set cannot simply pool all the individual content exposure data together and discard duplicate exposures while maintaining user privacy (as this would require publishers to share PII with each other or with a third party).

Instead, some embodiments use a cross-measurement system to estimate cross-publisher reach (and other cross-publisher statistics) without exposing any user PII in the content exposure data received from each publisher.

System Architecture

Figure 1:
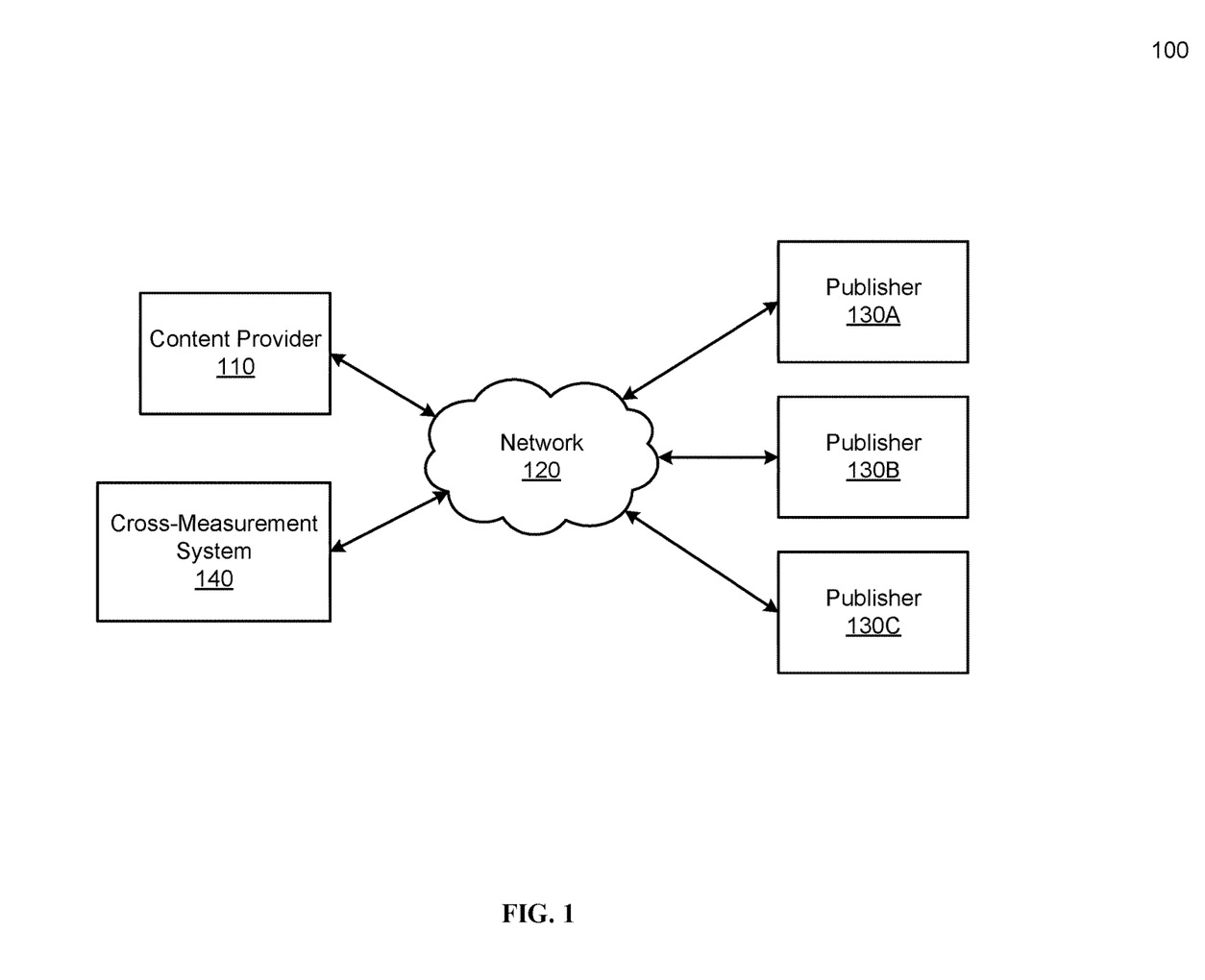
FIG. 1 is a block diagram of a system environment in which a cross-measurement system operates, in accordance with an embodiment.

FIG. 1 is a block diagram of a system environment in which a cross-measurement system operates, in accordance with an embodiment. The environment 100 of FIG. 1 includes a content provider 110, a network 120, a set of publishers 130A-C, and a cross-measurement system 140.

The content provider 110 is an online system or set of systems which sends one or more content items of a content set for display by each of the publishers 130, according to some embodiments. For example, the content provider 110 can be an individual, artist, brand, or company which disseminates content across platforms controlled by multiple publishers 130. The content provider 110 can provide the same content item for display by multiple publishers 130 and/or can provide different content items within the content set for display (for example, providing a video for display by one publisher 130 and a related static image to another publisher 130). In some implementations, the content provider 110 can use cross-publisher statistics about the displayed content items to gauge the impact of the content set and inform the creation of future content. For example, the content provider 110 can modify the content items of the content set, discontinue the content set (or one or more content items of the content set) or change plans for future content items and/or content sets based on the cross-publisher statistics.

In some implementations, the content provider 110, publishers 130, and cross-measurement system 140 are configured to communicate via the network 120. The network 120 can include any combination of local area and/or wide area networks and use both wired and/or wireless communication systems. In some embodiments, the network 120 uses standard communications technologies and/or protocols. For example, the network 120 can include communication links using technologies such as Ethernet, 802.11, worldwide interoperability for microwave access (WiMAX), 3G, 4G, code division multiple access (CDMA), digital subscriber line (DSL), etc. Examples of networking protocols that can be used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Each publisher 130 of the set of publishers 130A-C is an online system or set of online systems capable of displaying (or monitoring the display of) content items on one or more associated platforms, according to some implementations. Similarly, a publisher 130 can record content exposure data about content items displayed on the associated platforms. A publisher 130 can be associated with a set of platforms on which the publisher 130 can assign content items for display and record which users viewed each displayed content item on the associated platform. The set of platforms associated with a publisher 130 can include websites, digital publications, social networks, other online content delivery methods, tv, or print media. In some implementations, a publisher 130 can receive multiple content items from the same content set and provide each of those content items to one or more platforms for display to users (for example, providing a video content item to a video sharing platform and an article content item to a blog or other text based platform). In some implementations, a publisher 130 compiles content exposure data recording user PII for each user content items of the content item set are displayed to. For example, a publisher 130 can record a list of user PII for users that a content item in the content item set was displayed to. Each publisher 130 can transform its gathered content exposure data into a standardized format coordinated across the set of publishers 130A-C.

Then, the publisher 130 processes its recorded content exposure data into one or more publisher-specific Bloom filters representing the set of users exposed to the content. A publisher 130 can generate a single Bloom filter representing all users exposed to the content set by that publisher or can generate a set of Bloom filters, each representing a cohort (or subset) of the users exposed to content items of the content set by the publisher 130. A Bloom filter is a probabilistic data structure that uses an m bit array to represent a set S where all m bits are initially set to 0. Every element x in the set S is hashed using k independent uniform hash functions [$h1()$, $h2()$, . . . , $hk()$] each with range $\{1, \ldots, m\}$ and the corresponding bits in the array are set to 1. In a Bloom filter, the membership of an element y in the set S can be determined by hashing the query element y using the same k hash functions and checking if the all corresponding bits in the Bloom filter array are set to 1. If so, the element y is possibly in the set S, and if not, element y is known not to be in the set S. A publisher-specific Bloom filter representing a set of users exposed to the content set can be constructed by each publisher to enable the measurement system to calculate cross-publisher statistics without being able to discern whether any individual user has exposed to the content (i.e. without exposing user PII). Here, each element added to the publisher-specific Bloom filter can be an identifier of a user exposed to the content set. The publisher-specific Bloom filter or set of Bloom filters can be accompanied by metadata about the set of users represented by the Bloom filter, such as the number of unique users represented by the Bloom filter, a total number of exposures to the content set, or an average frequency of exposure for a user represented by the Bloom filter. Additionally, a publisher-specific Bloom filter representing a cohort can be accompanied by information defining the cohort, such as demographic information about the cohort (for example, females 18-34) or other information identifying the cohort.

The cross-measurement system 140 is an online system or set of online systems that coordinates with the set of publishers 130 to calculate cross-publisher statistics without exposing the user PII stored by each publisher 130 to other publishers 130, the cross-measurement system 140, or the content provider 110. The cross-measurement system 140 can be a server, server cluster, or other computing system capable of communicating with the content provider 110 and the publishers 130 over the network 120. In some implementations, the cross-measurement system 140 receives a set of publisher-specific Bloom filters, each representing content exposure data from a single publisher 130. Using the received publisher-specific Bloom filters, the cross-measurement system 140 can estimate the cross-publisher reach (and other cross-publisher statistics) by analyzing combinations of the received Bloom filters.

In some embodiments, the cross-measurement system 140 coordinates with the set of publishers to define a standardized process for generating Bloom filters, such that the received publisher-specific Bloom filters are in a standardized format which enable Bloom filters received from different publishers 130 to be combined by the cross-measurement system 140. In some implementations, similar Bloom filters (such as Bloom filters with the same number of bits m) can be combined by performing a bitwise OR operation on the Bloom filters to be combined. In some embodiments, a standardized format is defined such that for a given set of users, a Bloom filter generated by publisher A will be identical to a Bloom filter generated by publisher B. Then, the measurement system can combine ("union") the set of received Bloom filters to generate a cross-publisher Bloom filter representing the cross-publisher exposure of the content set. The cross-publisher Bloom filter can then be analyzed by the cross-measurement system 140 to determine the cross-publisher reach or other desired cross-publisher statistics.

Publisher System

Figure 2:
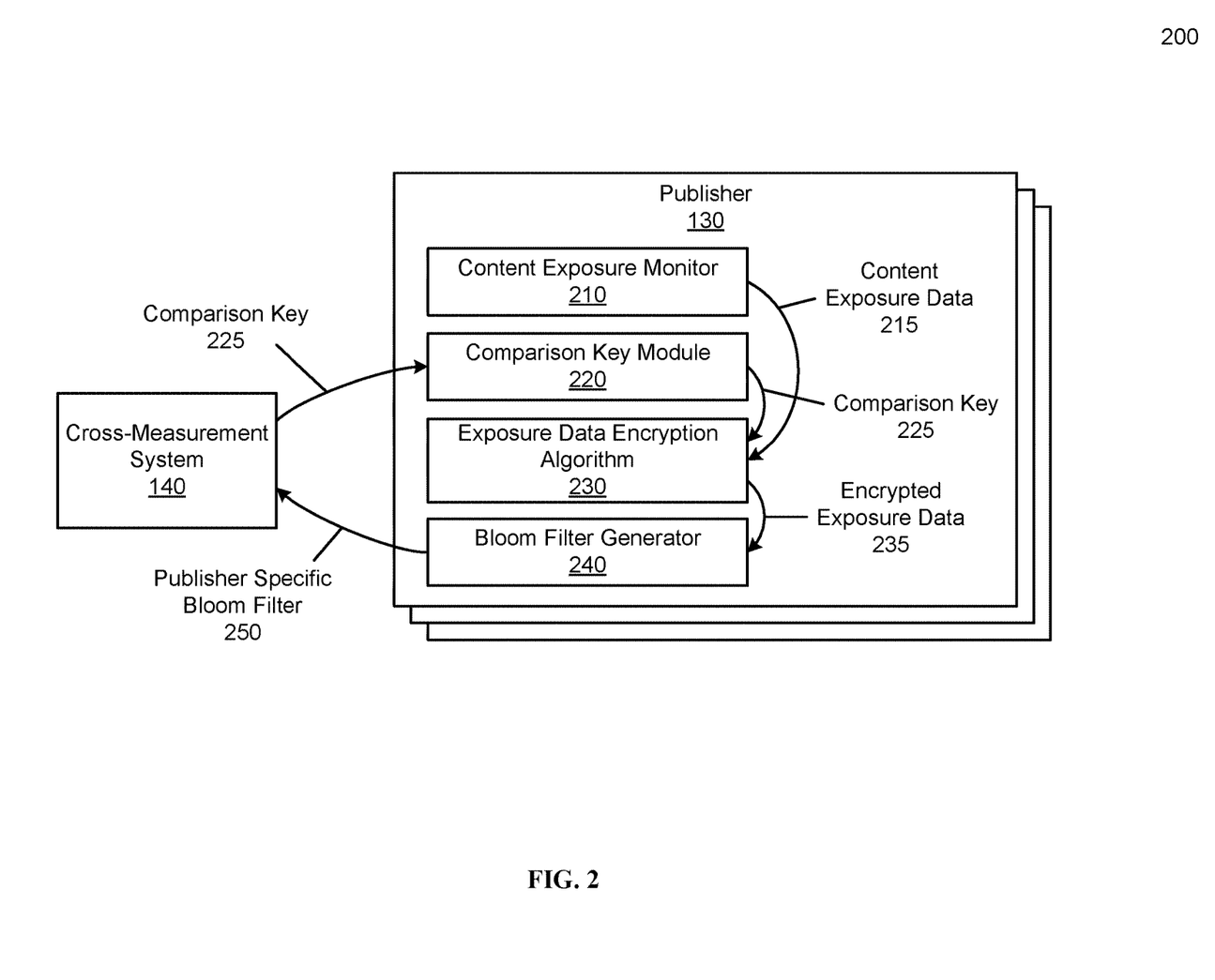
FIG. 2 is a block diagram of a publisher in communication with a cross-measurement system, in accordance with an embodiment.

FIG. 2 is a block diagram of a publisher in communication with a cross-measurement system, in accordance with an embodiment. The environment 200 of FIG. 2 includes a publisher 130 and a cross-measurement system 140, which can send a comparison key 225 to the publisher 130 and receive a publisher-specific Bloom filter 250 based on the comparison key 225 from the publisher 130. The publisher 130 of FIG. 2 includes a content exposure monitor 210 to collect content exposure data 215, a comparison key module 220 which receives the comparison key 225 from the measurement system 140, an exposure data encryption algorithm 230 which encrypts content exposure data into encrypted exposure data 235, and a Bloom filter generator 240 which generates a publisher-specific Bloom filter 250. In some embodiments, the Bloom filter generator 240 of each publisher 130 uses a standard process (a process common across the set of publishers 130) to generate publisher-specific Bloom filters 250. For example, the set of publishers 130 can be coordinated such that publisher-specific Bloom filters 250 across the set of publishers 130 are generated using the same schema of encrypted user identifiers to represent exposed users, same encryption algorithm and comparison key 225 to encrypt the PII identifiers, and common parameters (for example, size and hash functions) to generate the eventual publisher-specific Bloom filters 250. In other embodiments, a publisher 130 may include additional, fewer, or different components for various applications. Conventional components such as network interfaces, security functions, load balancers, failover servers, management and network operations consoles, and the like are not shown so as to not obscure the details of the system architecture.

The content exposure monitor 210 records instances when a user is exposed to content items of the content set on platforms associated with the publisher 130, according to some embodiments. In some implementations, an interaction between a user and a content item of the content set is treated as an exposure based on metrics set by the publisher 130 or the content provider 110. For example, an interaction can be treated as an exposure if the user saw (or was assumed to see), heard, interacted with, was displayed, or otherwise engaged with a content item of the content item set, depending on the metrics selected for that content set. In some embodiments, the content exposure monitor 210 logs each exposure of a content item to a user (in a format including PII of the user) for later analysis by the publisher 130. When the cross-measurement system 140 requests information from the publisher 130 (for example, for performing for cross-publisher analysis), the content exposure monitor 210 gathers the logged content exposure data 215 about the users exposed to the content set. The content exposure data 215 can include a list of user identifiers (PII) of each user exposed to the content set and other metadata about exposures to content of the content set on platforms associated with the publisher 130, such as a total number of exposures to content of the content set by the publisher 130 or an average frequency of exposure to the content set by the publisher 130.

In some embodiments, the set of publishers 130 use a common format for encrypting user identifiers (containing user PII) consistent across the set of publishers but unknown to the cross-measurement system 140 or other entities that shouldn't access user PII (such that the cross-measurement system 140 is unable to recreate the user PII from the encrypted user PII). In some implementations, a comparison key 225 is synced among the set of publishers (potentially with the aid of the measurement system) to establish the common format. The comparison key 225 is an encryption key used to encrypt user identifiers before the generation of a publisher-specific Bloom filter 250, according to some embodiments. A method of generating and syncing a comparison key across publishers 130 will be discussed further below. The comparison key module 220 of a publisher 130 can sync a comparison key 225 for the content set across the set of publishers 130 or receive an appropriate comparison key 225 from another publisher 130 or the measurement system 140. In some implementations, each publisher 130 will receive a comparison key 225 encrypted using a public key of unique to that publisher 120 (and decryptable using a private key stored by the publisher 130).

The publisher 130 can encrypt each user identifier in the content exposure data 210 (as each user identifier is PII of a user) using an exposure data encryption algorithm and a defined schema common across the set of publishers 130. The selected schema for user identifiers in content exposure data 215 can be consistent across the set of publishers 130 and may include PII independently determinable for each publisher 130. For example, the set of publishers 130 may use an agreed upon format of an email address, full name, mailing address, IP address, device ID, or defined combination of the above to represent a user in the content exposure data 215.

In some implementations, publishers use a HMAC (Hash-Based Message Authentication Code) technique to encrypt each user identifier of the gathered content exposure data 215 using the comparison key 225 as cryptographic key. A HMAC is a specific type of Message Authentication Code (MAC) using a cryptographic hash function and a secret cryptographic key to generate a representation of a users' PII. Compared to a standard hash function, HMAC is a keyed hash of data which also requires a secret key for hashing. Therefore, only parties with comparison key 225 (i.e. the set of publishers 130) will be able to generate encrypted user identifiers in the format used to generate the publisher-specific Bloom filters 250. In some implementations using HMAC techniques, even an outside entity encrypting user identifiers using the agreed on PII schema will not yield the same encrypted user identifiers without the correct comparison key 225. In some implementations, the resulting encrypted exposure data 235 contains a list of encrypted user identifiers, each representing a unique user exposed to content of the content set, but not able to be associated with user PII by entities without the comparison key 225. In some implementations, the encrypted user identifier for a given user is consistent across the set of publishers 130 because of the standardized user PII schema and comparison key 225.

After the content exposure data 215 is encrypted to obscure user PII, the Bloom filter generation module 240 uses the encrypted exposure data 235 to generate one or more publisher-specific Bloom filters 250. Then, the Bloom filter generation module 240 can send the generated publisher-specific Bloom filter(s) 250 to the measurement system 140 for analysis. As described above, a Bloom filter uses an m bit array to represent a set S. Every element x in the set S is hashed using k independent uniform hash functions and the corresponding bits in the Bloom filter are set to 1 to represent the inclusion of that element. Here, each publisher-specific Bloom filter 250 represents a set of encrypted user identifiers of users exposed to content of the content set by the publisher 130. In some embodiments, the publisher generates a single publisher-specific Bloom filter 250 representing all users exposed to content items of the content set. In other embodiments, the Bloom filter generation module 240 generates a set of cohort publisher-specific Bloom filters 250, each representing a cohort of users exposed to content items of the content set. In some implementations, if the set of cohort publisher-specific Bloom filters are combined, the result is a single publisher-specific Bloom filter 250 representing all users exposed to content items of the content set.

In some implementations, each publisher 130 further anonymizes generated publisher-specific Bloom filters 250 before they are sent to the cross-measurement system 140. For example, publishers 130 can use differential privacy techniques, such as perturbing the generated publisher-specific Bloom filters 250 by randomly flipping bits with a small probability. This added noise provides additional privacy protection for individual users by preventing attacks that utilize auxiliary information to reidentify users represented in the Bloom filters. However, the addition of a small amount of random noise does not significantly affect the ability of the cross-measurement system 140 to determine cross-publisher statistics, according to some embodiments. The publisher-specific Bloom filter 250 can then be sent to the cross-measurement system for analysis. In some implementations, each publisher-specific Bloom filter 317 sent by the publisher 130 is accompanied by metadata including a number of users the publisher-specific Bloom filter 250 represents (i.e. the cardinality of the publisher-specific Bloom filter 250), a total number of impressions by the publisher 130 to users represented by the publisher-specific Bloom filter 250, and/or an average frequency of exposure to the content set to users represented by the publisher-specific Bloom filter 250.

Cross-Publisher Measurement System

Figure 3:
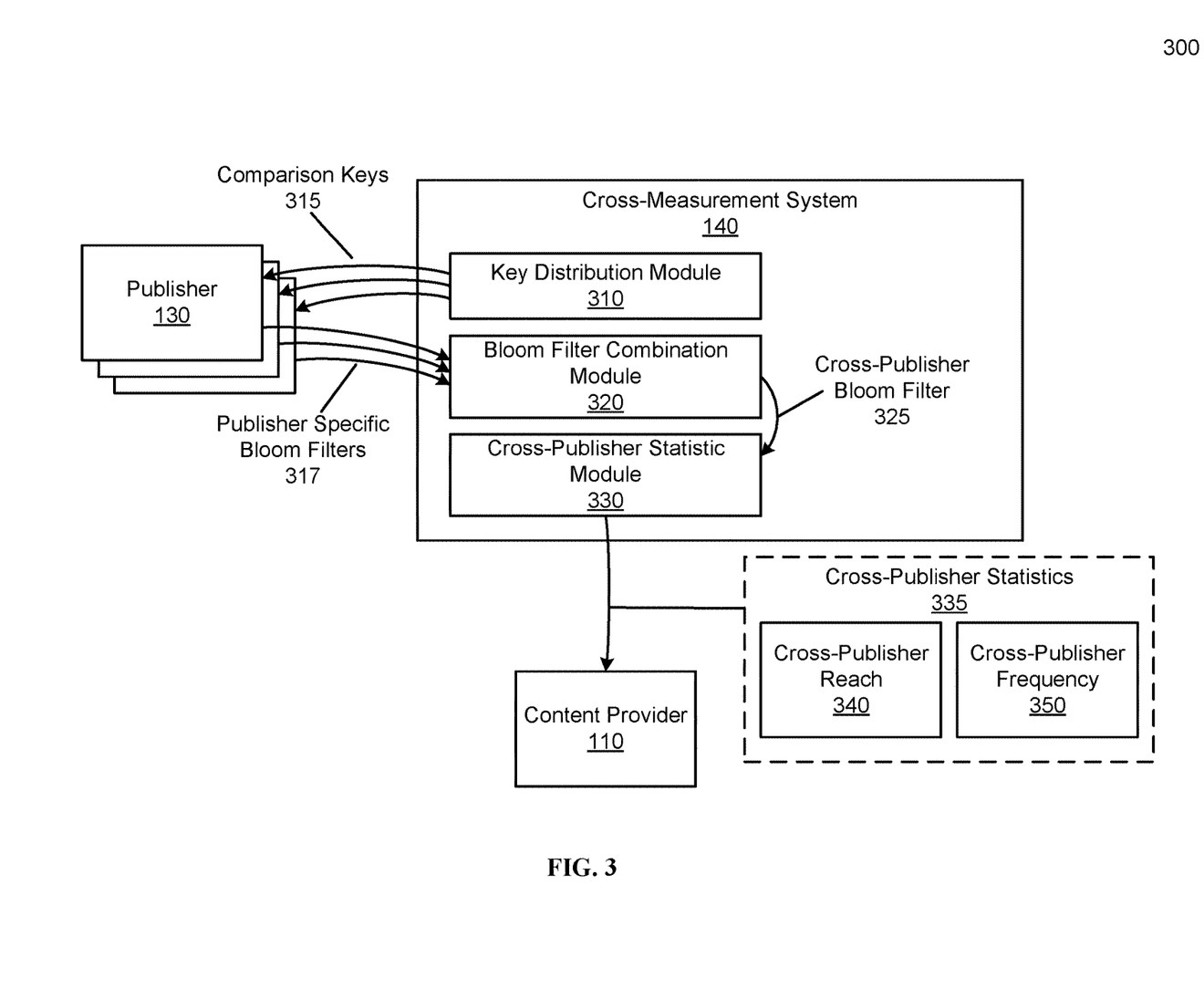
FIG. 3 is a block diagram of a cross-measurement system, in accordance with an embodiment.

FIG. 3 is a block diagram of a cross-measurement system, in accordance with an embodiment. The environment 300 of FIG. 3 includes a cross-measurement system 140, a set of publishers 130 and a content provider 110. The cross-measurement system 140 of FIG. 3 includes a key distribution module 310 which distributes comparison keys 315 to the set of publishers 130, a Bloom filter combination module 320 which combines received publisher-specific Bloom filters 317 into a cross-publisher bloom filter 325, and a cross-publisher statistic module 330 which can analyze the received cross-publisher Bloom filters 325 to determine cross-publisher statistics 335. The cross-publisher statistic module 330 can then send the cross-publisher statistics 335 (which may include cross-publisher reach 340 and cross-publisher frequency 350 for the content set) to the content provider 110. In other embodiments, the cross-measurement system 140 may include additional, fewer, or different components for various applications. Conventional components such as network interfaces, security functions, load balancers, failover servers, management and network operations consoles, and the like are not shown so as to not obscure the details of the system architecture.

The key distribution module 310 of the cross-measurement system 140 can facilitate the distribution of a comparison key 315 unknown to the cross-measurement system 140 to each of the set of publishers 130. As described above, the publishers 130 can user the comparison key 315 as an encryption key during the process of generating the publisher-specific Bloom filters 317. In some implementations, each publisher 130 is only in communication with the cross-measurement system 140 (and not each other publisher 130) to reduce operational and communicational cost between the publishers. Therefore, the cross-measurement system 140 can communicate the comparison key 315 with each publisher 130, without being able to access the comparison key 315 itself.

In some implementations, public key encryption techniques are used to share the comparison key 315 between the set of publishers 130 via the cross-measurement system 140 without the cross-measurement system 140 being able to access the comparison key 315. In some embodiments, each publisher 130 generates a public-private key pair, stores the private key, and shares the public key with the cross-measurement system 140. Then, the cross-measurement system can establish a directory that maps each publisher 130 with their public keys. When a comparison key 315 needs to be shared, the cross-measurement system 140 will share all the publisher public keys with one publisher 130 (the "facilitating publisher"). The facilitating publisher can then generate a comparison key 315 and separately encrypt the comparison key 315 using all the publisher public keys. The resulting list of encrypted comparison keys 315 (one for each publisher 130) is sent to the cross-measurement system 140 for distribution. In these embodiments, the cross-measurement system 140 distributes the encrypted comparison key list to the set of publishers 130 but cannot itself decrypt the comparison key 130.

As described above, the cross-measurement system 140 can receive one or more publisher-specific Bloom filters 317 from each of the set of publishers 130. The Bloom filter combination module 320 of the cross-measurement system 140 can combine publisher-specific Bloom filters 317 received from multiple publishers to generate one or more cross-publisher Bloom filters 325 representing the cross-publisher set of users that content items of the content set were exposed to. For example, the cross-measurement system 140 can combine all received publisher-specific Bloom filters 317 to generate an overall cross-publisher Bloom filter 325 representing every user the content set was exposed to. Similarly, in implementations using cohorts common across the set of publishers 130, the set of publisher-specific Bloom filters 317 for a specific cohort can be combined to generate a cohort cross-publisher Bloom filter 325 representing cross-publisher content exposure for that cohort. As described above, the publisher-specific Bloom filters 317 received for a content set have a standardized structure common across the set of publishers such that if publisher 130A and publisher 130B each produced a publisher-specific Bloom filter 317 for the same set of users, the resulting publisher-specific Bloom filters 317 should be identical (excluding the introduction of random noise for obfuscation purposes, as discussed above). The Bloom filter combination module 320 can combine two or more received publisher-specific Bloom filters 317 to generate cross-publisher Bloom filters 325 representing a set of users across multiple publishers 130. In some embodiments, the Bloom filter combination module 320 uses a bitwise OR operation to combine the set of publisher-specific Bloom filters 317 into a cross-publisher Bloom filter 325 representing the union of the sets of users represented by each of the publisher-specific Bloom filters 317. Similarly, the Bloom filter combination module 320 can use a bitwise AND operation to combine two or more publisher-specific Bloom filters 317 into a cross-publisher Bloom filter 325 representing the intersection of the sets of users represented by the combined publisher-specific Bloom filters 317. The resulting cross-publisher Bloom filter 325 can then be analyzed by the cross-publisher statistic module 330 to determine cross-publisher statistics 335 for the content set.

The cross-publisher statistic module 330 can estimate statistics for a content set based on features of one or more cross-publisher Bloom filters 325, according to some embodiments. Once the cross-measurement system 140 determines one or more cross-publisher Bloom filters 325, the cross-publisher statistic module 330 can determine cross-publisher statistics 335 representing the exposure of the content item across the publishers 130. In some implementations, the calculated cross-publisher statistics 335 are reported to the content provider 110 or another authorized entity for evaluation of the content set. In some implementations, the cross-publisher statistics 335 can be determined based on the cardinality of the cross-publisher Bloom filter 325 associated with that content set. The cardinality of a Bloom filter represents the number of unique entries into that Bloom filter, and, in the case of a cross-publisher Bloom filter 325, the cardinality represents the total number of unique users across the set of publishers 130. For example, the cross-publisher statistic module 330 can estimate the cardinality of a cross-publisher Bloom filter 325 based on the density of the Bloom filter. As more entries are added to a Bloom filter of a given structure, the density of the Bloom filter (the percentage of the m bits of the bloom filter that are set to "1") will increase at a predictable rate based on the number of bits m and the number of hash functions k each entry is associated with. Therefore, the density of a Bloom filter and the cardinality of the Bloom filter are probabilistically linked. This property can be used to estimate the cardinality of the cross-publisher Bloom filter 325 (i.e. the total number of users in the set S of a Bloom filter) to a high degree of accuracy (often within 1%), in some embodiments. For example, cardinality of a Bloom filter (and therefore the number of users represented by the cross-publisher Bloom filter 325) can be accurately estimated based on the formula:

$$|S| = \frac{\ln(z/m)}{k \ln(1 - 1/m)}$$

where |S| is the cardinality, z is the number of zero bits in the Bloom filter, m is the size of the Bloom filter, and k is the number of hash functions used to generate the Bloom filter (i.e. how many bits are associated with each user added to the Bloom filter). For cross-publisher Bloom filters 325 representing the union of the publisher-specific bloom filters 317, the cardinality (|S|) of the cross-publisher Bloom filter 325 represents the total number of unique users across the publisher-specific Bloom filters 317, i.e. the cross-publisher reach 340 for the content set. Similarly, for cross-publisher Bloom filters 325 representing the intersection of two or more publisher-specific bloom filters 317, the cardinality (|S|) of the cross-publisher Bloom filter 325 represents the number of unique users common to the combined publisher-specific Bloom filters 317, i.e. the overlap in users between the publishers 130.

In some embodiments, the cross-publisher statistic module 330 can calculate cross-publisher statistics 335 for the content set based on a cross-publisher Bloom filter 325, according to some embodiments. As described above, each publisher-specific Bloom filter 317 can include metadata relevant to that publisher-specific Bloom filter 317. For example, a publisher-specific Bloom filter 317 can be accompanied by metadata including a number of users the publisher-specific Bloom filter 317 represents (i.e. the cardinality of the publisher-specific Bloom filter 317), a total number of impressions by the publisher 130 to users represented by the publisher-specific Bloom filter 317, and/or an average frequency of exposure to the content set to users represented by the publisher-specific Bloom filter 317.

In some implementations, the cardinality of the cross-publisher Bloom filter 325 is the cross-publisher reach 335 of that Bloom filter, such as in implementations where the cross-publisher Bloom filter 325 represents the union of the publisher-specific Bloom filters 317. In other implementations (such as when the cross-publisher Bloom filter 325 represents the intersection of two or more publisher-specific Bloom filters 317), cross-publisher reach 340 can be calculated based on the cardinality of the cross-publisher Bloom filter 325 (i.e. the overlap between the publisher-specific Bloom filters 317) and the reach of each associated publisher-specific Bloom filter 317.

In some embodiments, a cross-publisher frequency 350 representing the average number of times a user is exposed to the content set can be estimated by the cross-publisher statistic module 330 based on the cross publisher reach 340. In some implementations, total impressions for each publisher-specific Bloom filter 317 are included in the metadata for the publisher-specific Bloom filter 317. Total impressions do not need to be de-duped and are additive across the set of publishers 130, such that cross-publisher frequency 350 can be determined by summing the total impressions for all publisher-specific Bloom filters 317 divided by the cross-publisher reach 340.

The cross-publisher statistic module 330 can determine, further cross-publisher statistics 335 such as an amount/percentage of overlap between two or more publishers 130, according to some implementations. Similar methods can be used to determine per-cohort statistics (for example, per-cohort cross-publisher reach 340 and cross-publisher frequency 350) using cohort cross-publisher Bloom filters 325. On receiving the cross-publisher statistics 335, the content provider 110 can, in some embodiments, adjust the delivery of future content items to, for example, reduce overlap between publishers 130 and/or achieve a target cross-publisher frequency 350.

Method for Cross-Publisher Statistic Generation

Figure 4:
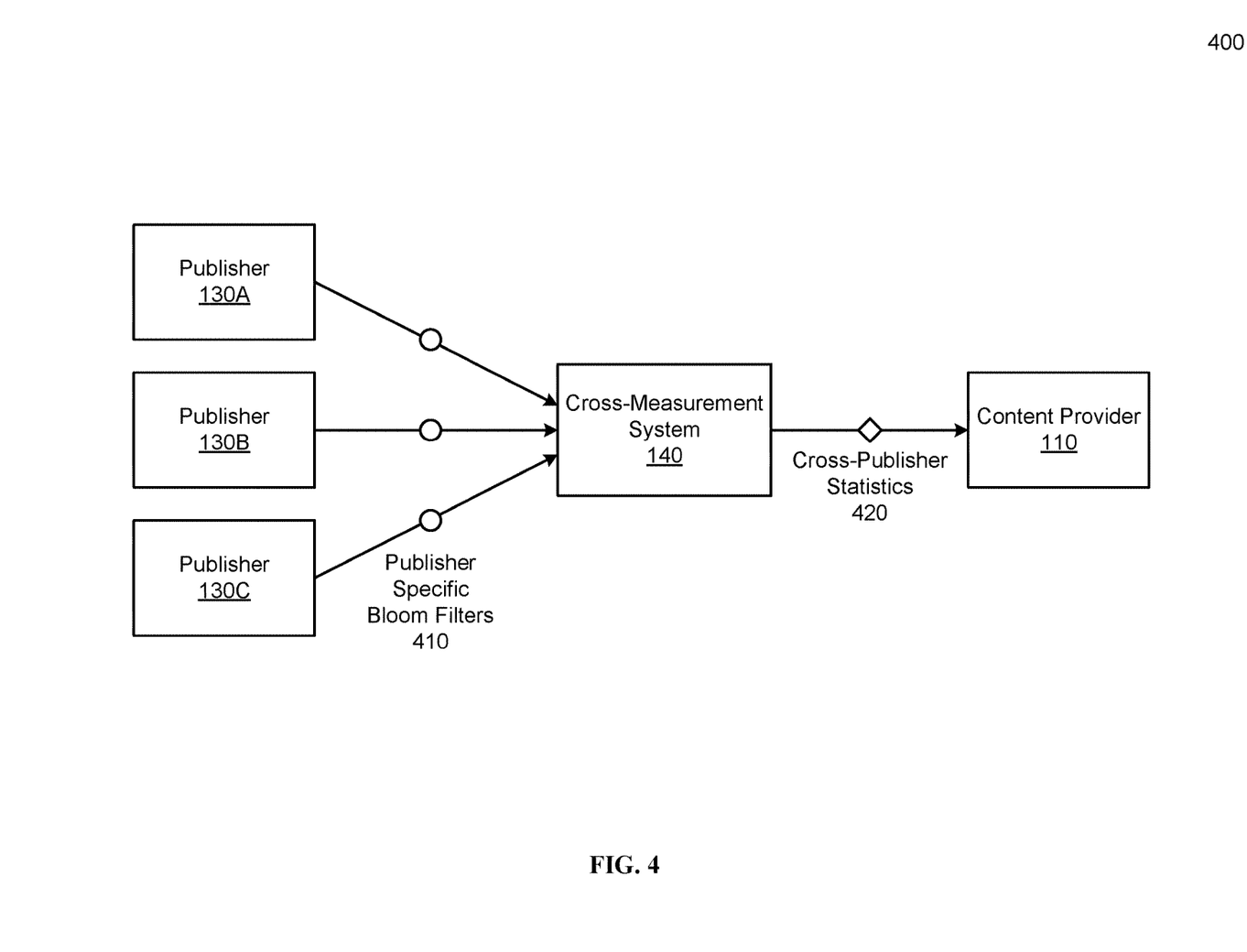
FIG. 4 illustrates interactions between a set of publishers and a cross-measurement system, in accordance with an embodiment.

FIG. 4 illustrates interactions between a set of publishers and a cross management system, in accordance with an embodiment. FIG. 4 shows a set of publishers 130A-C which monitor content exposure and generate publisher-specific Bloom filters 410, as described above. The publishers 130 then send the publisher-specific Bloom filters 410 to the cross-measurement system 140, which combines the received publisher-specific Bloom filters 410 into a cross-publisher Bloom filter, which is analyzed to determine a set of cross-publisher statistics 420 including cross-publisher reach and other statistics about the content across the set of publishers 130. The determined cross-publisher statistics

420 are then provided to the content provider 110 for use (for example, to update future content sets).

Figure 5:
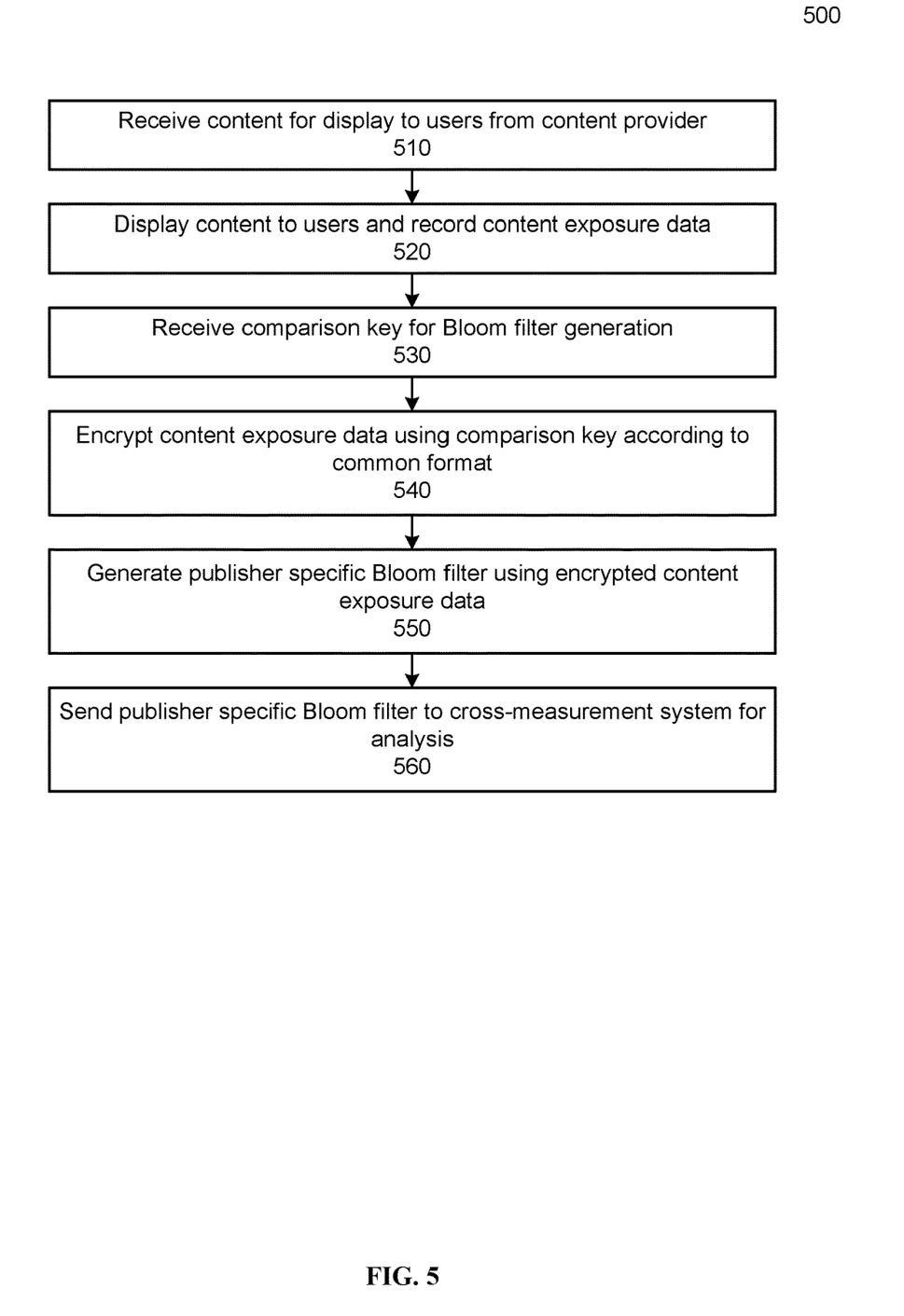
FIG. 5 is a flowchart illustrating an example process for generating publisher-specific Bloom filters at a publisher, in accordance with an embodiment.

FIG. 5 is a flowchart illustrating an example process for generating publisher-specific Bloom filters at a publisher, in accordance with an embodiment. The process 500 begins when a publisher receives 510 content from a content provider (for example, one or more content items of a content set). Then, the publisher displays 520 the received content to users and records content exposure data about which users were exposed to the content. For example, the publisher can display content items of the content set to one or more users and record which users were exposed to the content items. The publisher can eventually receive 530 a comparison key to use in generating publisher-specific Bloom filters. As described above, the publisher can receive a comparison key from the cross-measurement system in encrypted form, then decrypt the comparison key for use. The publisher can then format the gathered content exposure data into a standardized schema or format for publisher-specific Bloom filters and encrypt 540 the content exposure data using the received comparison key. The publisher uses the encrypted content exposure data to generate 550 a publisher-specific Bloom filter for that publisher. The generated publisher-specific Bloom filter is then sent 560 to the cross-measurement system for analysis.

Figure 6:
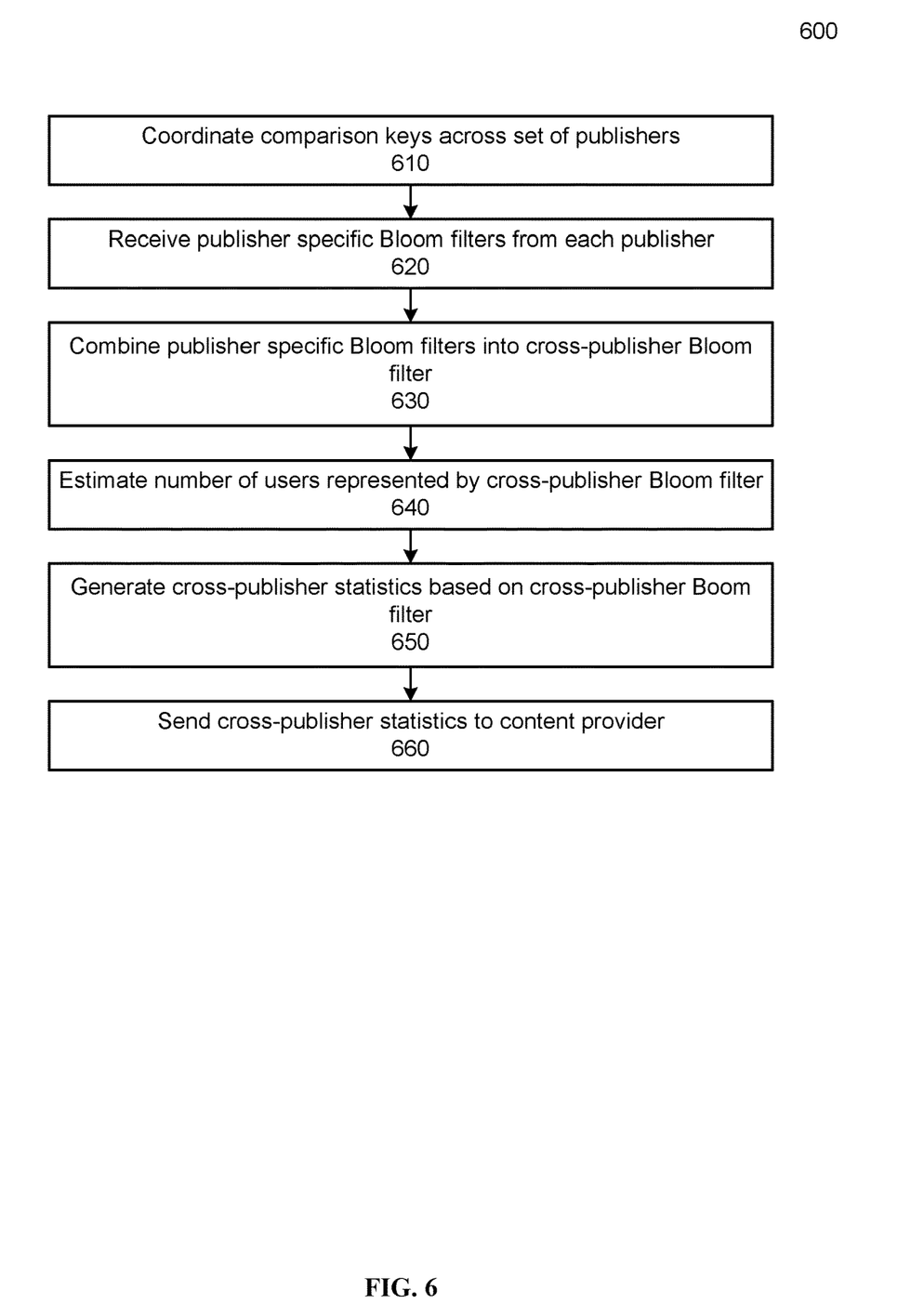
FIG. 6 is a flowchart illustrating an example process for determining and using cross-publisher exposure based on publisher-specific Bloom filters, in accordance with an embodiment.

FIG. 6 is a flowchart illustrating an example process for determining and using cross-publisher exposure based on publisher-specific Bloom filters, in accordance with an embodiment. The process 600 begins when the cross-measurement system coordinates 610 a comparison key across a set of publishers. As described above, the cross-measurement system can distribute pre-encrypted versions of the comparison key (not decryptable by the cross-measurement system) to each of the participating publishers. The cross-measurement system then receives 620 publisher-specific Bloom filters from each publisher of the set of publishers, where each publisher-specific Bloom filter represents content exposure data from that publisher. Then, the cross-measurement system combines 630 the publisher-specific Bloom filter into a cross-publisher Bloom filter representing cross-publisher content exposure for the content set. For example, the cross-measurement system can perform a bit-wise OR operation to determine a cross-publisher Bloom filter representing the union of the publisher-specific Bloom filters or the cross-measurement system can use a bitwise AND operation to determine a cross-publisher Bloom filter representing the intersection of two or more publisher-specific Bloom filters. Next, the cross-measurement system estimates 640 the number of users represented by the cross-publisher Bloom filter and uses the results to generate 650 cross-publisher statistics reflecting the overall statistics of the content set across the set of publishers. For example, the cross-measurement system can estimate the cardinality of the cross-publisher Bloom filter using the techniques described above (where the cardinality represents the number of users the cross-publisher Bloom filter represents) and use the estimated cardinality to determine a cross-publisher reach, cross-publisher frequency, or other relevant statistic. The generated cross-publisher statistics are then sent 660 to a content provider for use, for example, in deciding future content to produce and/or what publishers to send future content to.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting.

What is claimed is:

1. A method comprising:
    receiving, at a cross-measurement system, a set of publisher-specific Bloom filters, each publisher-specific Bloom filter comprising a combination of a hash function applied to an item of personally identifying information of each user of a cohort of users that were exposed to a content item by a particular publisher of a plurality of publishers;
    generating, based on a selected set of two or more of the publisher-specific Bloom filters, a cross-publisher Bloom filter by combining the selected set of two or more of the publisher-specific Bloom filters, the cross-publisher Bloom filter containing a group of users that were exposed to the content item across any of the publishers associated with the selected set of publisher-specific Bloom filters;

determining a number of users represented by the cross-publisher Bloom filter; and analyzing the cross-publisher Bloom filter to determine one or more cross-publisher statistics reflecting the content exposure of the content item across the plurality of publishers based on the determined number of users represented by the cross-publisher Bloom filter.

2. The method of claim 1, further comprising:

sending, to each publisher of the plurality of publishers, a comparison key; and wherein each of the publisher-specific Bloom filters are based on content exposure data encrypted using the comparison key.

3. The method of claim 1, further comprising transmitting, from the cross-measurement system to a content provider associated with the content item, the one or more cross-publisher statistics.

4. The method of claim 1, wherein each publisher-specific Bloom filter comprises a set of bits representing a set of users exposed to the content item by the publisher and the cross-publisher Bloom filter comprises a set of bits representing an combined set of users exposed to the content item by the plurality of publishers.

5. The method of claim 4, wherein generating the cross-publisher Bloom filter comprises combining the selected set of two or more publisher-specific Bloom filters by performing a bitwise OR operation on the selected set of two or more publisher-specific Bloom filters.

6. The method of claim 4, wherein generating the cross-publisher Bloom filter comprises combining the selected set of two or more publisher-specific Bloom filters by performing a bitwise AND operation on the selected set of two or more publisher-specific Bloom filters.

7. The method of claim 1, wherein determining a number of users represented by the cross-publisher Bloom filter comprises estimating the cardinality of the cross-publisher Bloom filter.

8. The method of claim 7, wherein estimating the cardinality of the cross-publisher Bloom filter comprises estimating the cardinality of the cross-publisher Bloom filter based on the density of the cross-publisher Bloom filter.

9. The method of claim 1, wherein the cross-publisher statistics comprise a cross-publisher reach representing the total number of unique users exposed the content item by the plurality of publishers.

10. The method of claim 1, wherein the cross-publisher statistics comprise a cross-publisher frequency representing an average number of times a user exposed to the content item was exposed to the content item across the plurality of publishers.

11. A non-transitory computer-readable storage medium comprising instructions which, when executed by a processor, cause the processor to perform the steps of:

receiving, at a cross-measurement system, a set of publisher-specific Bloom filters, each publisher-specific Bloom filter comprising a combination of a hash function applied to an item of personally identifying information of each user of a cohort of users that were exposed to a content item by a particular publisher of a plurality of publishers;

generating, based on a selected set of two or more of the publisher-specific Bloom filters, a cross-publisher Bloom filter by combining the selected set of two or more of the publisher-specific Bloom filters, the cross-publisher Bloom filter associated with exposure of the content item across the publishers associated with the selected set of publisher-specific Bloom filters;

determining a number of users represented by the cross-publisher Bloom filter; and analyzing the cross-publisher Bloom filter to determine one or more cross-publisher statistics reflecting the content exposure of the content item across the set of publishers based on the determined number of users represented by the cross-publisher Bloom filter.

12. The non-transitory computer-readable storage medium of claim 11, wherein the instructions further cause the processor to perform the steps of:

sending, to each publisher of the plurality of publishers, a comparison key; and wherein each of the publisher-specific Bloom filters are based on content exposure data encrypted using the comparison key.

13. The non-transitory computer-readable storage medium of claim 11, wherein the instructions further cause the processor to perform the step of transmitting, from the cross-measurement system to a content provider associated with the content item, the one or more cross-publisher statistics.

14. The non-transitory computer-readable storage medium of claim 11, wherein each publisher-specific Bloom filter comprises a set of bits representing a set of users exposed to the content item by the publisher and the cross-publisher Bloom filter comprises a set of bits representing an combined set of users exposed to the content item by the plurality of publishers.

15. The non-transitory computer-readable storage medium of claim 14, wherein generating the cross-publisher Bloom filter comprises combining the selected set of two or more publisher-specific Bloom filters by performing a bitwise OR operation on the selected set of two or more publisher-specific Bloom filters.

16. The non-transitory computer-readable storage medium of claim 14, wherein generating the cross-publisher Bloom filter comprises combining the selected set of two or more publisher-specific Bloom filters by performing a bitwise AND operation on the selected set of two or more publisher-specific Bloom filters.

17. The non-transitory computer-readable storage medium of claim 11, wherein determining a number of users represented by the cross-publisher Bloom filter comprises estimating the cardinality of the cross-publisher Bloom filter.

18. The non-transitory computer-readable storage medium of claim 17, wherein estimating the cardinality of the cross-publisher Bloom filter comprises estimating the cardinality of the cross-publisher Bloom filter based on the density of the cross-publisher Bloom filter.

19. The non-transitory computer-readable storage medium of claim 11, wherein the cross-publisher statistics comprise a cross-publisher reach representing the total number of unique users exposed the content item by the plurality of publishers.

20. The non-transitory computer-readable storage medium of claim 11, wherein the cross-publisher statistics comprise a cross-publisher frequency representing an average number of times a user exposed to the content item was exposed to the content item across the plurality of publishers.

* * * * *

UNITED STATES PATENT AND TRADEMARK OFFICE
CERTIFICATE OF CORRECTION

PATENT NO. : 11,216,588 B1
APPLICATION NO. : 16/880889
DATED : January 4, 2022
INVENTOR(S) : An et al.

It is certified that error appears in the above-identified patent and that said Letters Patent is hereby corrected as shown below:

In the Claims

Column 13, Claim 4, Line 25, delete "an combined" and insert -- a combined --, therefor.

Column 13, Claim 9, Line 46, delete "cross-publisher reach representing" and insert -- cross-publisher each representing --, therefor.

Column 13, Claim 9, Line 47, delete "users exposed the" and insert -- users exposed to the --, therefor.

Column 14, Claim 14, Lines 30-31, delete "an combined" and insert -- a combined --, therefor.

Column 14, Claim 19, Line 57, delete "cross-publisher reach representing" and insert -- cross-publisher each representing --, therefor.

Column 14, Claim 19, Line 58, delete "users exposed the" and insert -- users exposed to the --, therefor.

Signed and Sealed this
Tenth Day of May, 2022

Katherine Kelly Vidal
*Director of the United States Patent and Trademark Office*